United States Patent [19]

Ivanov

[11] 4,416,353
[45] Nov. 22, 1983

[54] METHOD AND DEVICE FOR ACHIEVING AN ANTI-LOCKING EFFECT WHILE STOPPING THE WHEELS OF A VEHICLE

[75] Inventor: Vassil W. Ivanov, Sofia, Bulgaria
[73] Assignee: VMEI "lenin", Sofia, Bulgaria
[21] Appl. No.: 266,101
[22] Filed: May 21, 1981
[51] Int. Cl.³ .............................................. B60T 1/06
[52] U.S. Cl. ................................. 188/2 A; 188/181 T
[58] Field of Search ......................... 188/2 A, 181 T; 301/6 R, 6 S, 6 W, 41 R

[56] References Cited

U.S. PATENT DOCUMENTS 2,239,459  4/1941  Kattwinkel ................. 188/181 T X
3,490,566  1/1970  Von Keszycki ................ 188/181 T Primary Examiner—Duane A. Reger

[57] ABSTRACT

Method of and device for achieving an anti-locking effect while stopping the wheels of a vehicle. A tangential elasticity is created on the wheel being braked, while from the moment of locking the brake the wheel begins to perform cyclic pendulum-like rotations around its axis. The wheel being braked is affixed to the hub of the vehicle by elastic elements, for example springs. The elastic elements can be fixed in an intermediate ring, disposed between the crown and the central disc of the wheel, if the wheel is not built as an integral body, or in sockets formed in telescopically disposed flanges on members fixed respectively to the wheel disc and the hub of the vehicle, if the wheel is constructed as a single integral body.

5 Claims, 6 Drawing Figures

METHOD AND DEVICE FOR ACHIEVING AN ANTI-LOCKING EFFECT WHILE STOPPING THE WHEELS OF A VEHICLE

This invention relates to a method of and a device for achieving an anti-locking effect while stopping the wheels of a vehicle. Such method and apparatus can be used for automobiles and other vehicles for increasing the effectiveness of their brakes and for achieving greater traffic safety.

There exists a method for achieving an anti-locking effect of the brake while stopping the wheels of the vehicle according to which such effect is achieved through a cyclic reduction and increase of the braking moments of torque applied to the wheels of the vehicle. According to this method, the wheels perform rolling, sliding, rolling, etc., in consecutive order. This is achieved through a periodic locking and releasing of the brakes of the vehicle.

There are devices which carry out the above referred to method which contain electronic control lock sensors on the wheels and a braking force modulator. Such devices are described by Gurevich and Melamud, "Brake control by the car," Transport, 1978, p. 152, and Pchelin and Ilarionov, "Car brake dynamism with locking devices."

Automobile Industry, 1977, issue 2, p. 13.

The disadvantages of prior anti-brake-locking methods and devices are their complexity caused by the necessity of electronic components, their high precision requirements for hydraulic systems and sensors, and the resulting high price, difficult maintenance and repair. Another disadvantage is that an added source of energy is necessary for their operation. These are the reasons that such prior methods and devices have not been widely used in present motor vehicles.

The present invention has among its objects the provision of a method for achieving an anti-brake-locking effect while stopping the wheels of a vehicle, and a device for practicing such method, which operate on mechanical principles without the necessity of an additional source of energy. Such device is of simple design, can be easily maintained and repaired, and thus can be economically used either in newly produced or in existing vehicles.

The above objects are achieved by a method and apparatus of the present invention. In accordance with the method, an anti-locking effect while braking the wheels of a vehicle is obtained by the provision of a tangential elasticity on the wheels being braked. From the moment of locking the brake of a wheel provided with the device of the invention, the wheel begins to perform cyclic pendulum-like rotation around its axis. In the device for carrying out such method, the wheel provided with a tire on a rim is affixed to the hub of the vehicle bearing such wheel by elastic elements, for example springs. In a first disclosed embodiment of the device of the invention, the wheel is made of two parts having limited freedom of rotation with respect to each other, one of which is a wheel disc mounted on the hub and the other of which is a rim upon which the tire is mounted. In a second disclosed embodiment of the device of the invention, the wheel proper is integral and is attached to the hub through the medium of a member composed of two interfitting annular members, one of which is secured to the hub of the vehicle and the other of which is secured to the wheel of the vehicle. Elastic elements such as springs acting between such interfitting elements permit a limited turning of one such element relative to the other. In the embodiment shown, such elements are disposed in telescoping relationship, the inner element being affixed to the wheel and the outer element being affixed to the hub of the vehicle and carrying a safety ring.

The advantages of the above described methods and devices according to the invention are their simplified design, their ease of maintenance and repair, and the possibility of mass application of such devices to newly produced vehicles as well as to existing vehicles. A primary advantage, as pointed out above, is that the operation of the devices requires no additional source of energy, the energy for their operation being derived solely from the braking force of the vehicle.

The anti-brake-locking method and apparatus of the invention will be better understood upon consideration of the accompanying drawings, wherein.

Figure 3:
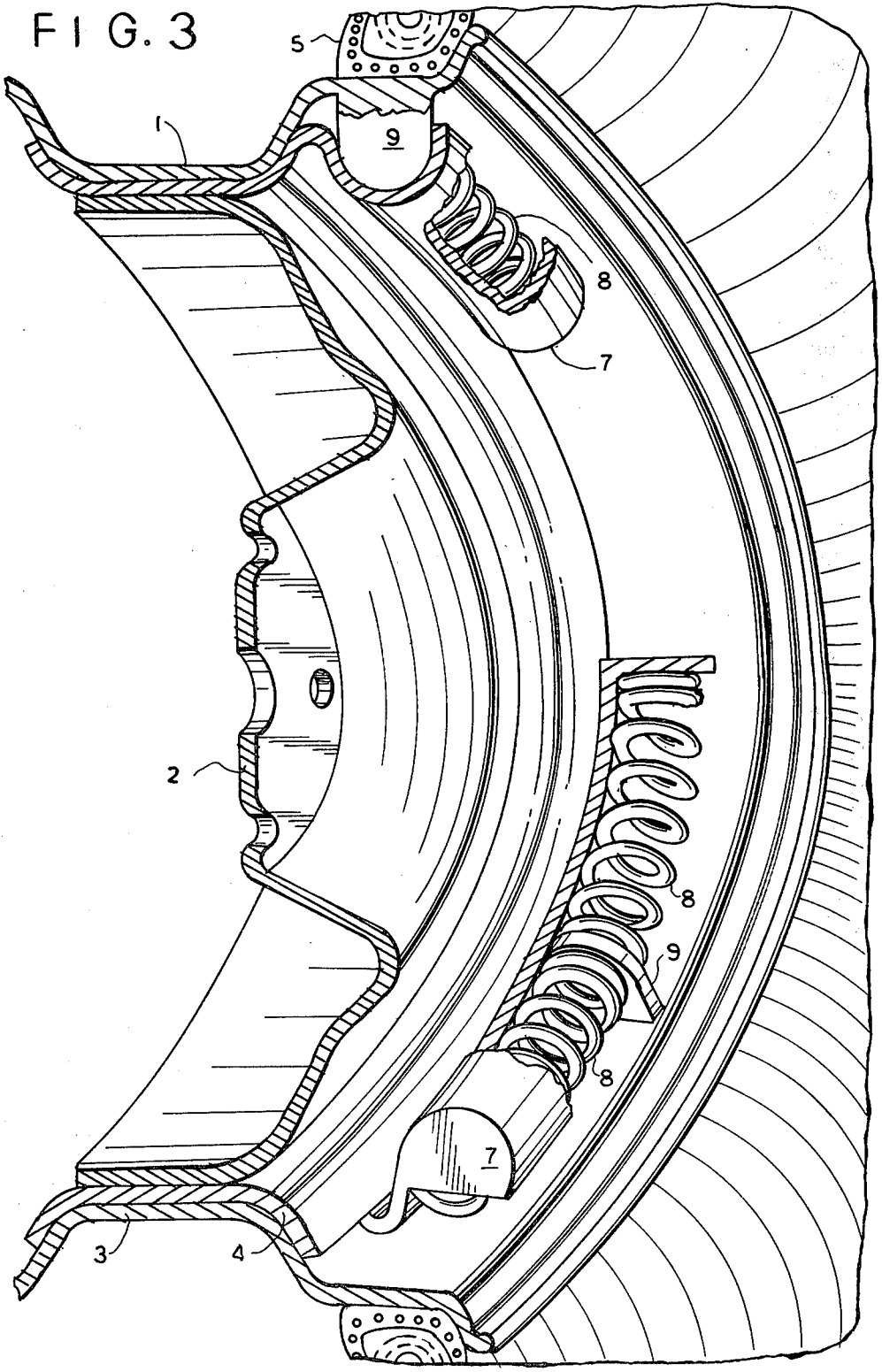
FIG. 3 is a fragmentary view in cross-section of a first embodiment of the device of preventing locking of a vehicle brake in accordance with the invention.

Turning first to FIG. 3, which shows the first disclosed embodiment of the invention, the wheel there shown has a rim portion 1 and a disc portion 2. The rim 1 has a crown 3 which receives a pneumatic tire 5. Interposed between the radially inner surface of the crown 3 and the radially outer surface of the radially outer annular flange on the disc 2, there is an intermediate ring member 4 which is secured to the annular radially outer flange on the disc 2 by being welded to it. The intermediate ring 4, which is capable of limited rotational movement with respect to the crown 3, has radially outwardly bent flanges on its axially inner and outer ends, such flanges overlying the annularly disposed side walls of the annular crown 3, so that the crown 3 and the intermediate ring 4 are prevented from axial movement with respect to each other. It is to be understood that the disc 2 of the wheel is to be mounted upon and secured to a wheel hub such as hub 6 (FIG. 4) of a vehicle.

A plurality of angularly spaced sockets 7 are affixed to the axially outer, radially outer periphery of the intermediate ring 4, the projection 9 affixed to the crown 3 being centrally positioned between the end walls of each socket 7 when the vehicle is at rest and unbraked. Similar coil compression springs 8 are disposed between each end wall of a socket 7 and the confronting face of its respective projection 9.

Figure 1:
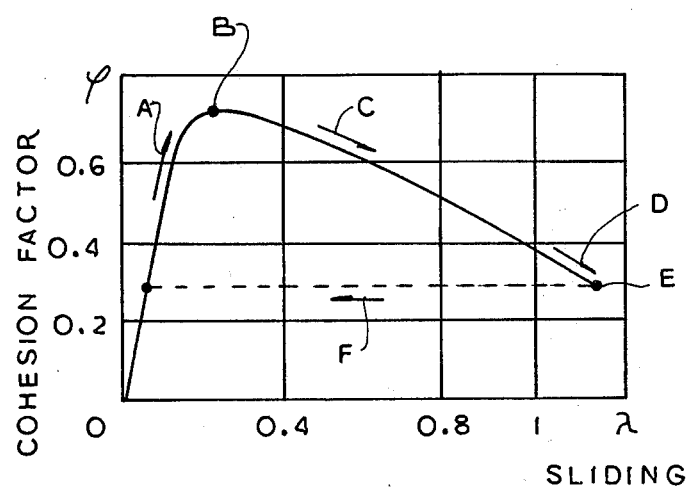
FIG. 1 is a graph showing the relationship between the cohesion factor rho ($\rho$) of the tire with the road as a function of the sliding factor lambda ($\lambda$) when the velocity of the vehicle is constant.
Figure 2:
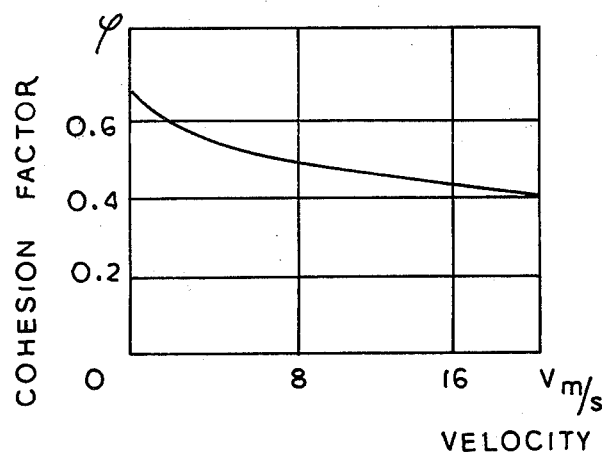
FIG. 2 is graph showing the relationship between the cohesion factor $\rho$ and the velocity V when is a constant.

The above described device operates as follows:

Upon the actuation of the brake mechanism, a braking force is created in the zone of contact between the tire 5 and the road surface. This causes the elastic elements 8 in each of the sockets 7 to be compressed, assuming that the vehicle is traveling forwardly. and the elastic elements 8 in each socket 7 to elongate. The increase in the delay of the turning of the wheel disc 2 with respect to the turning of the crown 3 and the tire 5 thereon, causes an increase in the braking force, as is indicated by the arrow A in FIG. 1. The deformation of the elastic elements 8 begins as a function of the value of the braking force. When there is a continuing increase of the cohesion between the tire and the roadway as a function of the sliding $\lambda$ between the tire and the road, a maximum cohesion is achieved at point B in FIG. 1. At this point, the elastic elements 8 are deformed by a force corresponding to the maximum possible value of the braking force for the specific road. The further increase of the sliding brings about a reduction in the cohesion between the tire and the road surface, as shown by the arrow C. When a complete locking of the wheel disc 2 occurs, a skidding of the tire 5 appears along the road when $\lambda = 1$. At such condition, the elastic elements 8 turn the crown 3 bearing the tire 5 backwards to a direction opposite to the direction of the movement of the vehicle because such elements have been deformed by the maximum braking force (at point B) until the moment of skidding or sliding, and they have not been released. At that moment, the cohesion factor is further reduced, as shown by the arrow D, due to the increase of the velocity of sliding (V, FIG. 2), which leads to an additional release of the elastic elements 8 up to the point E.

Once the reverse movement has been terminated, the cohesion of the tire 5 with respect to the road and a new cycle of tension of the elastic elements 8 begins, during which time the tire 5 rolls on the road although the wheel disc 2 is locked by the brake. The additional increase of brake efficiency is achieved both by an increase in the average value of the cohesion factor, and because unwarmed zones of the tire 5 come into contact with the road during the backward rotation of the wheel.

Figure 4:
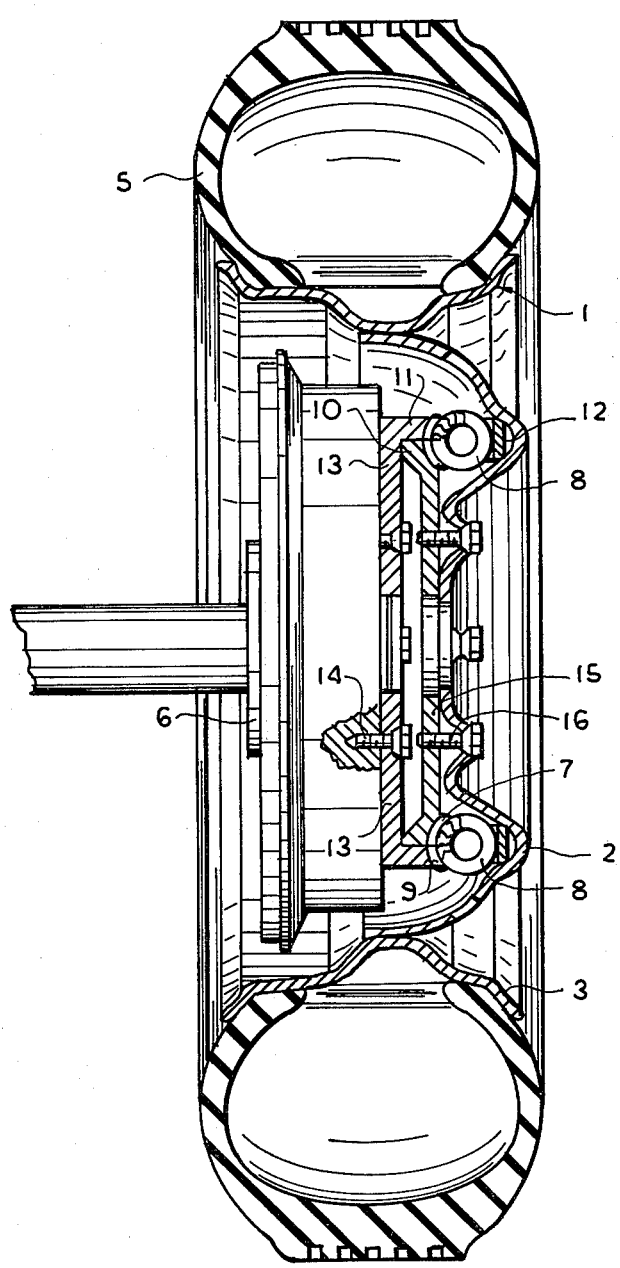
FIG. 4 is a view partially in elevation and partially in axial section of a second embodiment of the device of the invention, such device permitting the mounting of the anti-brake-locking device without a change of the design of the vehicle wheel.
Figure 5:
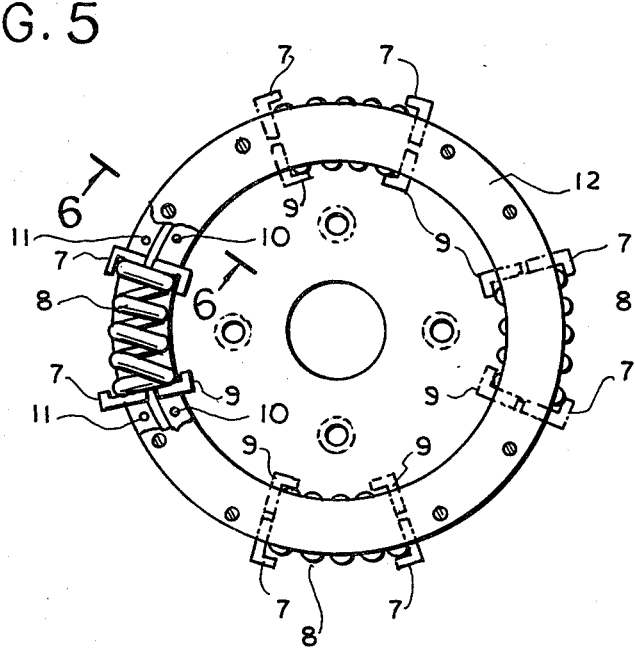
FIG. 5 is a fragmentary view in elevation of the device of the invention looking in the direction of the arrow O in FIG. 4.
Figure 6:
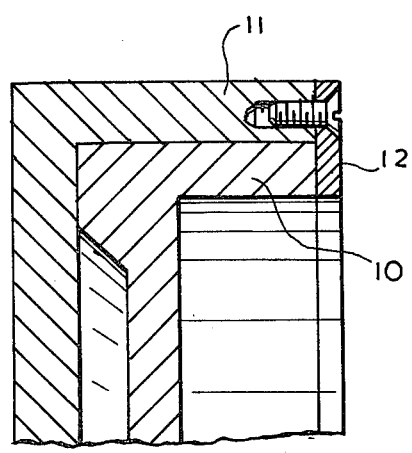
FIG. 6 is a fragmentary view in section, the section being taken along line 6—6 in FIG. 5.

In FIGS. 4 and 5 there is disclosed a second embodiment of the device of the invention. Such device, which operates in the same manner as that above described in connection with the first disclosed embodiment of the device, permits the use of a wheel which is of integral construction, that is, in which the wheel disc 2 is fixedly connected to the crown 3 of the wheel. In this embodiment, there is interposed between the hub 6 and the wheel disc 2 an assembly having a radially outer annular flange 11 and a radially inner flange 10, flange 10 accurately but slidingly fitting within flange 11. Integral with flange 11 there is a disc 13 which is secured to the hub 6 by machine screws or lugs 14. The flange 10 is integrally connected with an annular member 15, which is secured to the central part of the wheel disc 2 by machine screws or lugs 16.

A plurality of sockets 7 are connected to the radially inner flange 11, and a plurality of projections 9 confronting such sockets are connected to the outer flange 10. A safety ring 12, secured to the outer flange 11, retains the coil compression springs 8 in place between the socket 7.

Although the invention is illustrated and described with reference to a plurality of embodiments thereof, it is to be expressly understood that it is in no way limited to the disclosure of such preferred embodiments but is capable of numerous modifications within the scope of the appended claims.

I claim:

1. A method for achieving an anti-locking effect while stopping the wheels of a vehicle, comprising providing a tangential elasticity between the wheels and the respective brake elements secured to the wheels in both directions of the relative rotation between the wheels and their respective brake element, and locking the brakes and maintaining them locked until the vehicle is stopped, whereby from the moment of locking of the brake the wheel performs a cyclic pendulum-like rotation about its axis.

2. An anti-brake-locking device for the wheel of a vehicle, the wheel being carried by a hub, the hub having a braked member secured to the wheel, the improvement wherein the braked member and the wheel are mounted for limited rotational movement with respect to each other and comprising elastic elements interposed between the braked member and the wheel, such elastic elements while the brakes are locked constantly urging the braked member and the wheel to rotate relative to each other into a central, neutral position.

3. A device according to claim 2, wherein the wheel has a rim made up of two parts, the two parts of the rim being rotatable to a limited extent relative to each other, one of such parts being a crown mounting a tire, and the other of such parts being affixed to a central wheel disc, and an intermediate ring affixed to the wheel disc, a plurality of spring sockets being provided on the intermediate ring, and a projection affixed to the crown confronting each of said spring sockets, the elastic elements being coil compression springs disposed between the spring sockets in the respective projections.

4. A device according to claim 2, wherein the wheel is made as a single integral body, and the elastic elements are disposed in an assembly made up of a radially inner disc affixed to the wheel disc and a radially outer disc affixed to the braked element, a plurality of sockets formed on the radially inner disc and a plurality of projections formed on the radially outer disc and confronting respective sockets, the elastic elements being coil compression springs disposed between respective sockets and projections.

5. A device according to claim 4, comprising a safety ring affixed to the radially outer ring of the assembly and being disposed axially outwardly of the spring sockets and the projections, in order to prevent radially inner ring from axial displacement in comparation with radially outer ring.

* * * * *